US010197475B2

(12) United States Patent
Okabe et al.

(10) Patent No.: US 10,197,475 B2
(45) Date of Patent: Feb. 5, 2019

(54) SUB-FRAME MECHANISM FOR A TIRE TESTING MACHINE

(71) Applicants: IHI Corporation, Tokyo (JP); IHI Logistics & Machinery Corporation, Tokyo (JP)

(72) Inventors: Michinari Okabe, Tokyo (JP); Hidenari Ota, Tokyo (JP); Naoyuki Neagari, Tokyo (JP)

(73) Assignees: IHI CORPORATION, Tokyo (JP); IHI LOGISTICS & MACHINERY CORPORATION, Tokyo (JP)

( * ) Notice: Subject to any disclaimer, the term of this patent is extended or adjusted under 35 U.S.C. 154(b) by 27 days.

(21) Appl. No.: 15/793,049

(22) Filed: Oct. 25, 2017

(65) Prior Publication Data

US 2018/0045610 A1    Feb. 15, 2018

Related U.S. Application Data

(63) Continuation of application No. PCT/JP2017/002130, filed on Jan. 23, 2017.

(30) Foreign Application Priority Data

May 20, 2016 (JP) .................................. 2016-101649
Jul. 25, 2016 (JP) .................................. 2016-145451

(51) Int. Cl.
*G01M 17/02* (2006.01)

(52) U.S. Cl.
CPC .......... *G01M 17/022* (2013.01); *G01M 17/02* (2013.01)

(58) Field of Classification Search
None
See application file for complete search history.

(56) References Cited

U.S. PATENT DOCUMENTS

| 4,475,383 A | 10/1984 | Fischer et al. |
| 4,956,995 A * | 9/1990 | Harrold ............... G01M 17/022 73/146 |
| 5,481,907 A | 1/1996 | Chasco et al. |
| 7,140,242 B1 * | 11/2006 | Poling, Sr. .......... G01M 17/022 73/146 |

(Continued)

FOREIGN PATENT DOCUMENTS

| JP | 5-5677 A | 1/1993 |
| JP | 8-507152 A | 7/1996 |

(Continued)

*Primary Examiner* — Andre Allen
(74) *Attorney, Agent, or Firm* — Rothwell, Figg, Ernst & Manbeck, P.C.

(57) ABSTRACT

A tire tester includes a rotary member, a tire support mechanism, and an actuator configured to advance and retreat at least one of the rotary member and the tire support mechanism with respect to the other. The tire support mechanism includes a main frame connected with the actuator, a subframe supporting an axle extending in a second direction orthogonal to a first direction in which the rotary member or the tire support mechanism advances and retreats with the actuator, and movably attached to the main frame such that a distance of the subframe from the main frame decreases and increases in a direction crossing the first direction; and at least one measurement unit provided between the main frame and the subframe.

16 Claims, 10 Drawing Sheets

(56) References Cited

U.S. PATENT DOCUMENTS

| | | | | |
|---|---|---|---|---|
| 2007/0256484 A1* | 11/2007 | Imanishi | ............ | G01M 17/022 |
| | | | | 73/146 |
| 2010/0031740 A1* | 2/2010 | Olex | .................. | G01M 17/013 |
| | | | | 73/146 |
| 2011/0000292 A1* | 1/2011 | Yoshikawa | ......... | G01M 17/021 |
| | | | | 73/146 |
| 2012/0167674 A1* | 7/2012 | Sumitani | ............ | G01M 17/021 |
| | | | | 73/146 |
| 2014/0109662 A1* | 4/2014 | Koide | ................. | G01M 17/022 |
| | | | | 73/118.01 |
| 2014/0260583 A1* | 9/2014 | Vernyi | ............... | G01M 17/021 |
| | | | | 73/146 |
| 2015/0143868 A1 | 5/2015 | Okada et al. | | |

FOREIGN PATENT DOCUMENTS

| | | |
|---|---|---|
| JP | 2003-294585 A | 10/2003 |
| JP | 2014-2079 A | 1/2014 |

\* cited by examiner

SUB-FRAME MECHANISM FOR A TIRE TESTING MACHINE

CROSS-REFERENCE TO RELATED APPLICATIONS

This application is a continuation application based on PCT Application No. PCT/JP2017/002130, filed Jan. 23, 2017, which claims priority to Japanese Patent Application Nos. 2016-101649, filed May 20, 2016 and 2016-145451, filed Jul. 25, 2016. The entire contents of all of which are incorporated herein by reference.

BACKGROUND OF THE INVENTION

1. Field of the Invention

The present disclosure relates to a tire tester.

2. Disclosure of the Related Art

Japanese Unexamined Patent Publication No. H5-005677 discloses a tire tester configured to test a tire. The tire tester includes a rotary drum including a circumferential surface functioning as a tire-traveling simulation road surface, and a tire support mechanism supporting a tire serving as test target.

The tire support mechanism includes a hydraulic servo cylinder, a first load cell measuring compressive force, and a second load cell measuring bending force. The main body of the hydraulic servo cylinder is fixed to a fixing wall. A piston rod of the hydraulic servo cylinder is capable of supporting a tire to be rotatable around a predetermined rotation axis. The hydraulic servo cylinder brings the tire supported with the piston rod to be close to and apart from the rotary drum, in a second direction orthogonal to a first direction in which the rotation axis extends. The first and the second load cells are attached to the piston rod.

When the tire is pressed against the circumferential surface of the rotary drum with the hydraulic servo cylinder and the rotary drum is rotated, the tire is also rotated. In this state, loads act on the piston rod in the first direction, the second direction, and a third direction (tangential direction of the tire) orthogonal to both the first direction and the second direction. The load (pressing load Fz) acting on the piston rod in the second direction is measured with the first load cell. Respective loads (lateral force (cornering force) Fx and rolling resistance Fy) acting on the piston rod in the first direction and the third direction, respectively, are measured with the second load cell.

BRIEF SUMMARY OF THE INVENTION

A tire tester according to an aspect of the present disclosure includes: a rotary member including a circumferential surface functioning as a traveling simulation road surface for a tire; a tire support mechanism configured to support the tire; and an actuator configured to advance and retreat at least one of the rotary member and the tire support mechanism with respect to the other such that the tire supported with the tire support mechanism is brought close to and apart from the circumferential surface of the rotary member. The tire support mechanism includes: an axle extending in a second direction orthogonal to a first direction in which the rotary member or the tire support mechanism advances and retreats with the actuator, and supporting the tire to be rotatable such that a ground contact surface of the tire is opposed to the circumferential surface of the rotary member; a main frame connected with the actuator; a subframe supporting the axle, and movably attached to the main frame such that a distance of the subframe from the main frame decreases and increases in a direction crossing the first direction; and at least one measurement unit provided between the main frame and the subframe.

The detailed description given herein below and the accompanying drawings are given by way of illustration only.

DETAILED DESCRIPTION OF THE INVENTION

Figure 1:
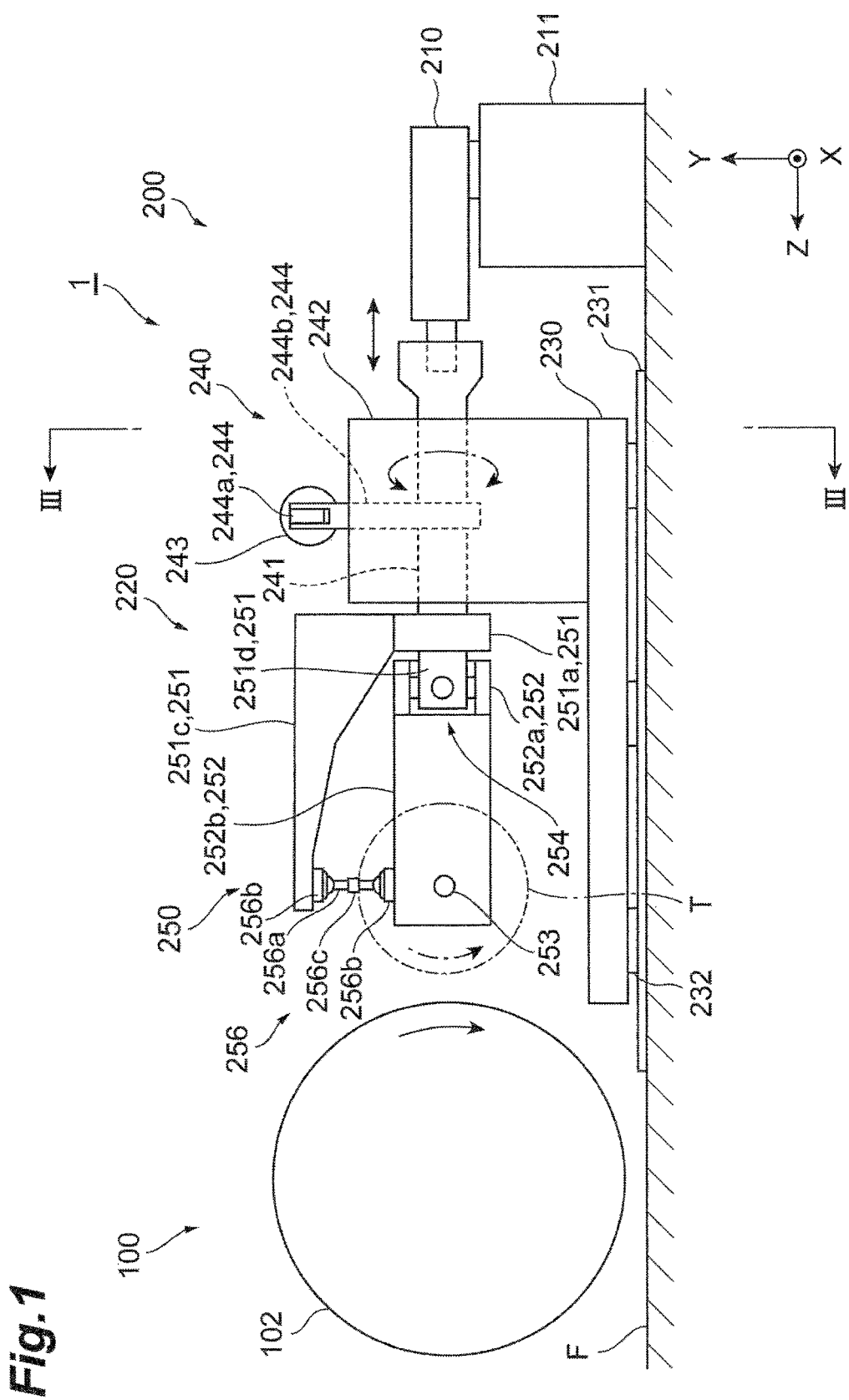
FIG. 1 is a side view illustrating an example (first example) of a tire tester.

Overview (1) A tire tester according to an example of the present embodiment includes: a rotary member including a circumferential surface functioning as a traveling simulation road surface for a tire; a tire support mechanism configured to support the tire; and an actuator configured to advance and retreat at least one of the rotary member and the tire support mechanism with respect to the other such that the tire supported with the tire support mechanism is brought close to and apart from the circumferential surface of the rotary member. The tire support mechanism includes: an axle extending in a second direction orthogonal to a first direction in which the rotary member or the tire support mechanism advances and retreats with the actuator, and supporting the tire to be rotatable such that a ground contact surface of the tire is opposed to the circumferential surface of the rotary member; a main frame connected with the actuator; a subframe supporting the axle and movably attached to the main frame such that a distance of the subframe from the main frame decreases and increases in a direction crossing the first direction; and at least one measurement unit provided between the main frame and the subframe.

In the tire tester according to one example of the present embodiment, the subframe supports the axle, and is attached movably to the main frame such that the distance of the subframe from the main frame decreases and increases in the direction crossing the first direction. For this reason, even when the actuator drives the tire support mechanism to make the ground contact surface of the tire contact the circumferential surface of the rotary member and the tire receives a load from the rotary member, the subframe is not moved in the first direction, but moved in the direction crossing the first direction. Accordingly, the measurement unit provided between the main frame and the subframe hardly includes components of the load acting on the tire in the first direction. This structure enables accurate measurement of the components of the load acting on the tire in a predetermined direction (direction in which the main frame and the subframe are opposed).

(2) In the device described in the above-described item (1), the main frame and the subframe may be opposed to each other in the second direction, and the subframe may be attached to the main frame via a linear motion bearing such that the distance from the main frame decreases and increases in the second direction. In this case, the subframe is linearly moved in the second direction with respect to the main frame with the linear motion bearing. Specifically, rotation movement of the subframe with respect to the main frame is restricted with the linear motion bearing. For this reason, the measurement unit hardly includes the rotation component (moment) of the subframe. Accordingly, the measurement unit is enabled to measure, with very high accuracy, the load generated on the tire in the second direction, when the ground contact surface of the tire contacts the rotary member.

(3) In the device described in the above-described item (1), the main frame and the subframe may be opposed to each other in a third direction orthogonal to both the first direction and the second direction, and the subframe may be attached to the main frame via a linear motion bearing such that the distance of the subframe from the main frame decreases and increases in the third direction. In this case, the subframe is linearly moved in the third direction with the linear motion bearing with respect to the main frame. Specifically, the rotation movement of the subframe with respect to the main frame is restricted with the linear motion bearing. For this reason, the measurement unit hardly includes the rotation component (moment) of the subframe. Accordingly, the measurement unit is enabled to measure, with very high accuracy, the load generated on the tire in the third direction, when the ground contact surface of the tire contacts the rotary member.

(4) The device described in the above-described item (1) may further include an auxiliary frame disposed between the main frame and the subframe, wherein the main frame may include: a first portion opposed to the subframe in the second direction; and a second portion opposed to the subframe in a third direction orthogonal to both the first direction and the second direction, the at least one measurement unit may include: a first measurement unit provided between the first portion and the subframe; and a second measurement unit provided between the second portion and the subframe, the subframe may be attached to the auxiliary frame via a first linear motion bearing such that a distance of the subframe from the main frame decreases and increases in one of the second direction and the third direction, and the auxiliary frame may be attached to the main frame via a second linear motion bearing such that a distance of the auxiliary frame from the main frame decreases and increases in the other of the second direction and the third direction. In this case, the subframe is linearly moved in the second direction with the first linear motion bearing with respect to the auxiliary frame. Specifically, the rotation movement of the subframe with respect to the auxiliary frame is restricted with the first linear motion bearing. By contrast, the auxiliary frame is linearly moved in the third direction with the second linear motion bearing with respect to the main frame. Specifically, the rotation movement of the auxiliary frame with respect to the main frame is restricted with the second linear motion bearing. For this reason, the first and the second measurement units hardly include the rotation components (moment) of the subframe and the auxiliary frame. Accordingly, the first measurement unit is enabled to measure, with very high accuracy, the load generated on the tire in the second direction, when the ground contact surface of the tire contacts the rotary member. In the same manner, the second measurement unit is enabled to measure, with very high accuracy, the load generated on the tire in the third direction, when the ground contact surface of the tire contacts the rotary member. This structure enables measurement, with very high accuracy, each of the component of the load generated on the tire in the second direction, and the component of the load generated on the tire in the third direction, in one tire tester.

(5) In the device described in the above-described item (1), the subframe may be attached to the main frame such that the subframe is rotatable around a support shaft extending in a direction orthogonal to the first direction. In this case, the subframe is not moved in the first direction, but rotated around the support axis, even when the actuator drives the tire support mechanism to make the ground contact surface of the tire contact the circumferential surface of the rotary member and the tire receives a load from the rotary member. Accordingly, the measurement unit provided between the main frame and the subframe hardly includes the component of the load acting on the tire in the first direction. This structure enables measurement of the component acting on the tire in a predetermined direction (direction in which the main frame and the subframe are opposed) with accuracy.

(6) In the device described in the above-described item (5), the support shaft may be disposed on an imaginary straight line extending through a central point of the tire and extending in the first direction, as viewed from an axis direction of the support shaft, in a state in which the tire is attached to the axle. When the support shaft is distant from the imaginary straight line, because the measurement value of the measurement unit increases or decreases according to the distance, correction of the measurement value may be required. However, because such correction is unnecessary when the support shaft is disposed on the imaginary straight line, this structure enables easy measurement of the load in the measurement unit.

(7) In the device described in the above-described item (5) or (6), the main frame and the subframe may be opposed to each other in the second direction, and the support shaft may extend along a third direction orthogonal to both the first direction and the second direction. In this case, the measurement unit is enabled to measure the load generated on the tire in the second direction when the ground contact surface of the tire contacts the rotary member.

(8) In the device described in the above-described item (5) or (6), the main frame and the subframe may be opposed to each other in a third direction orthogonal to both the first direction and the second direction, and the support shaft may extend along the second direction. In this case, the measurement unit is enabled to measure the load generated on the tire in the third direction when the ground contact surface of the tire contacts the rotary member.

(9) In the device described in the above-described item (5) or (6), the main frame may include a first portion opposed to the subframe in the second direction, and a second portion opposed to the subframe in a third direction orthogonal to both the first direction and the second direction, the support shaft may include a first shaft extending along the third direction and supporting the subframe rotatably with respect to the first portion, and a second shaft extending along the second direction and supporting the subframe rotatably with respect to the second portion, and the at least one measurement unit may include a first measurement unit provided between the first portion and the subframe, and a second measurement unit provided between the second portion and the subframe. In this case, this structure enables accurate measurement each of the component of the load generated on the tire in the second direction, and the component of the load generated on the tire in the third direction, in one tire tester.

(10) In the device described in the above-described item (9), the support shaft may be a universal joint including the first shaft and the second shaft. In this case, one support shaft achieves both rotation of the subframe with respect to the first portion of the main frame, and rotation of the subframe with respect to the second portion of the main frame. This structure enables simplification of the device.

(11) In the device described in any one of the above-described items (1) to (10), the measurement unit may include a coupling member coupling the main frame with the subframe, and a load sensor configured to measure a load generated on the coupling member, and each of end portions of the coupling member may be connected with the main frame and the subframe via a bearing having degree of freedom in at least two directions of the second direction and a third direction orthogonal to both the first direction and the second direction. In this case, when the subframe is rotated around the support shaft, the coupling member hardly bends. For this reason, this structure enables measurement of the component of the load acting on the tire in the direction in which the main frame and the subframe are opposed, with higher accuracy in the load sensor.

(12) In the device described in the above-described item (11), the bearing may be a spherical bearing.

In the following description, and referring to the accompanying drawings, identical constituent elements or the constituent elements having the identical function will be given identical reference signs and redundant explanations are omitted.

Structure of Tire Tester

Figure 2:
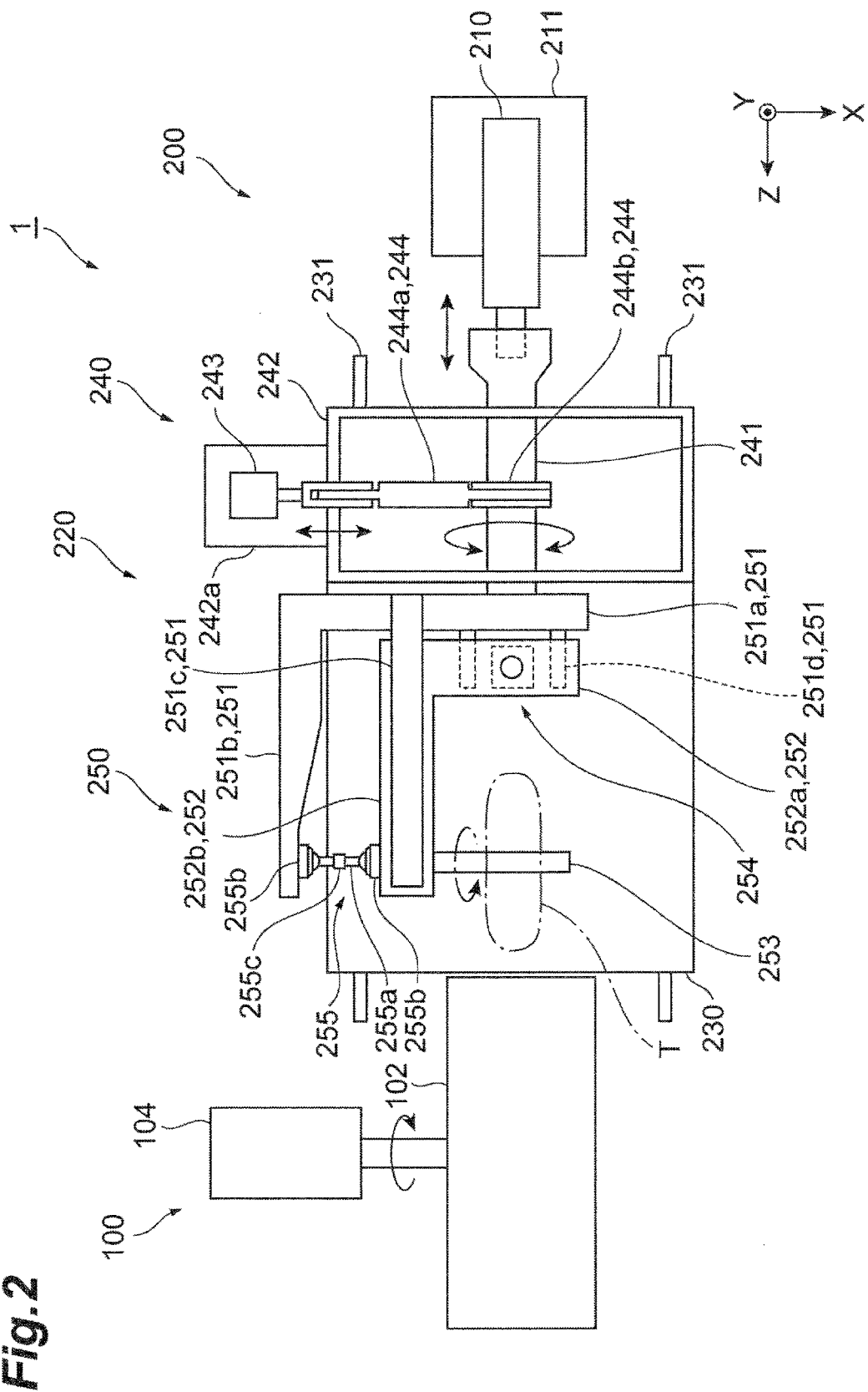
FIG. 2 is a top view illustrating the example (first example) of the tire tester.
Figure 3:
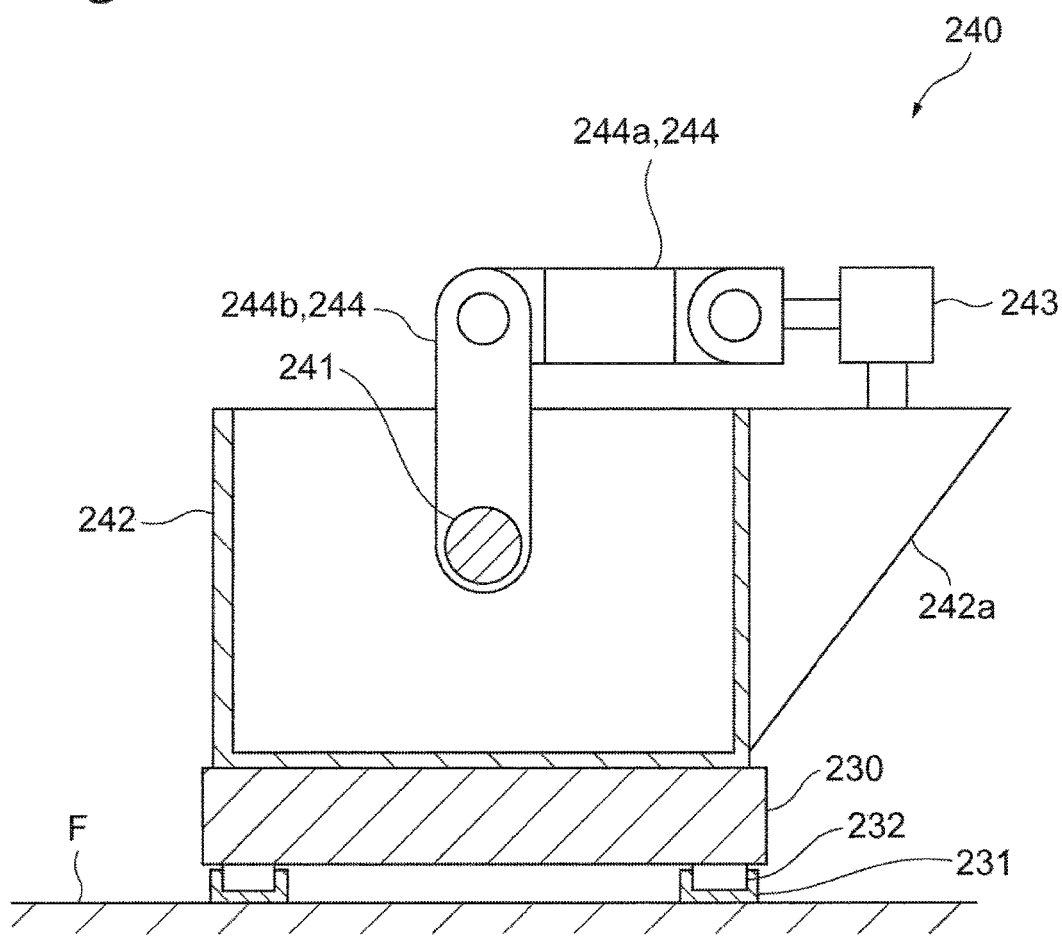
FIG. 3 is a cross-sectional view taken along line III-III of FIG. 1.

A tire tester 1 according to a first example illustrated in FIG. 1 to FIG. 3 is a device configured to test a tire T. Specifically, the tire tester 1 measures loads (lateral force Fx, rolling resistance Fy, and pressing load Fz) generated on the traveling tire T. As illustrated in FIG. 1 and FIG. 2, the tire tester 1 includes a rotary mechanism 100 and a test device main body 200.

The rotary mechanism 100 includes a rotary member (rotary drum) 102 and an electric motor 104. The rotary member 102 is a flat cylindrical member. A circumferential surface of the rotary member 102 functions as a traveling simulation road surface of the tire T. The electric motor 104 is a drive mechanism rotating and driving the rotary member 102 around an axis extending in the horizontal direction. In the present specification, the direction in which the rotary axis (central axis of the electric motor 104) of the rotary member 102 is referred to as "X direction" (second direction).

The test device main body 200 includes an actuator 210, and a tire support mechanism 220. The actuator 210 is mounted on a base 211 provided on the floor surface F. The actuator 210 is a drive mechanism advancing and retreating the tire support mechanism 220 with respect to the rotary member 102 along a direction being a horizontal direction and orthogonal to the X direction. When the actuator 210 advances and retreats the tire support mechanism 220 with respect to the rotary member 102, the tire T supported with the tire support mechanism 220 is brought close to and apart from the circumferential surface of the rotary member 102. In the present specification, the drive direction of the tire support mechanism 220 with the actuator 210 is referred to as "Z direction" (first direction), and a direction orthogonal to both the X direction and the Z direction is referred to as "Y direction" (third direction). The actuator 210 is, for example, a hydraulic cylinder, and extends and contracts the piston rod along the Z direction.

The tire support mechanism 220 includes a base 230, an angle adjustment mechanism 240, and a measurement mechanism 250. The base 230 has a rectangular parallelepiped shape, and functions as a base on which the angle adjustment mechanism 240 and the measurement mechanism 250 are placed. The base 230 is provided on the floor surface F via a guide rail 231 and a slider 232.

The guide rail 231 extends in a straight-line manner in the Z direction between the rotary mechanism 100 and the actuator 210. The slider 232 is configured to be slidable on the guide rail 231. The slider 232 forms a linear motion bearing (linear guide) together with the guide rail 231. The slider 232 is provided on a lower surface of the base 230. For this reason, when the slider 232 moves along the guide rail 231, the base 230, the angle adjustment mechanism 240, and the measurement mechanism 250 also move, as a whole member, along the guide rail 231.

The angle adjustment mechanism 240 includes a main shaft 241, a support housing 242, an actuator 243, and a link mechanism 244. The main shaft 241 is a cylindrical member extending in the Z direction. The main shaft 241 is attached to the support housing 242 via a bearing (not illustrated), such as a rolling bearing. For this reason, the main shaft 241 is rotatably attached to the support housing 242 around an axis thereof.

A proximal end portion (end portion on the actuator 210 side) of the main shaft 241 is connected with a distal end portion of the piston rod of the actuator 210, via a bearing such as a rolling bearing. For this reason, even when the main shaft 241 is rotated, the piston rod of the actuator 210 is not rotated. A distal end portion (end portion on the measurement mechanism 250 side) of the main shaft 241 is connected with the measurement mechanism 250.

The support housing 242 is a rectangular tube member having a bottom and an open top. The support housing 242 is placed on the base 230. A side wall surface of the support housing 242 is provided with an auxiliary base 242a projecting outward in the X direction (see FIG. 2 and FIG. 3).

The actuator 243 is placed on the auxiliary base 242a. The actuator 243 is a drive mechanism driving the link mechanism 244. The actuator 243 is, for example, a hydraulic cylinder, and extends and contracts the piston rod along the X direction.

The link mechanism 244 includes link members 244a and 244b. Each of the link members 244a and 244b is a flat plate extending in a straight line manner. One end portion of the link member 244a is attached, rotatably around an axis extending in the Z direction, to the piston rod of the actuator 243. The other end portion of the link member 244a is attached, rotatably around an axis extending in the Z direction, to one end portion of the link member 244b. The other end portion of the link member 244b is fixed to the main shaft 241. For this reason, when the actuator 243 extends and contracts the piston rod, one end portion of the link member 244b is pushed and pulled in the Y direction via the piston rod and the link member 244a. In this manner, the main shaft 241 to which the other portion of the link member 244b is fixed is rotated around its axis.

Figure 4:
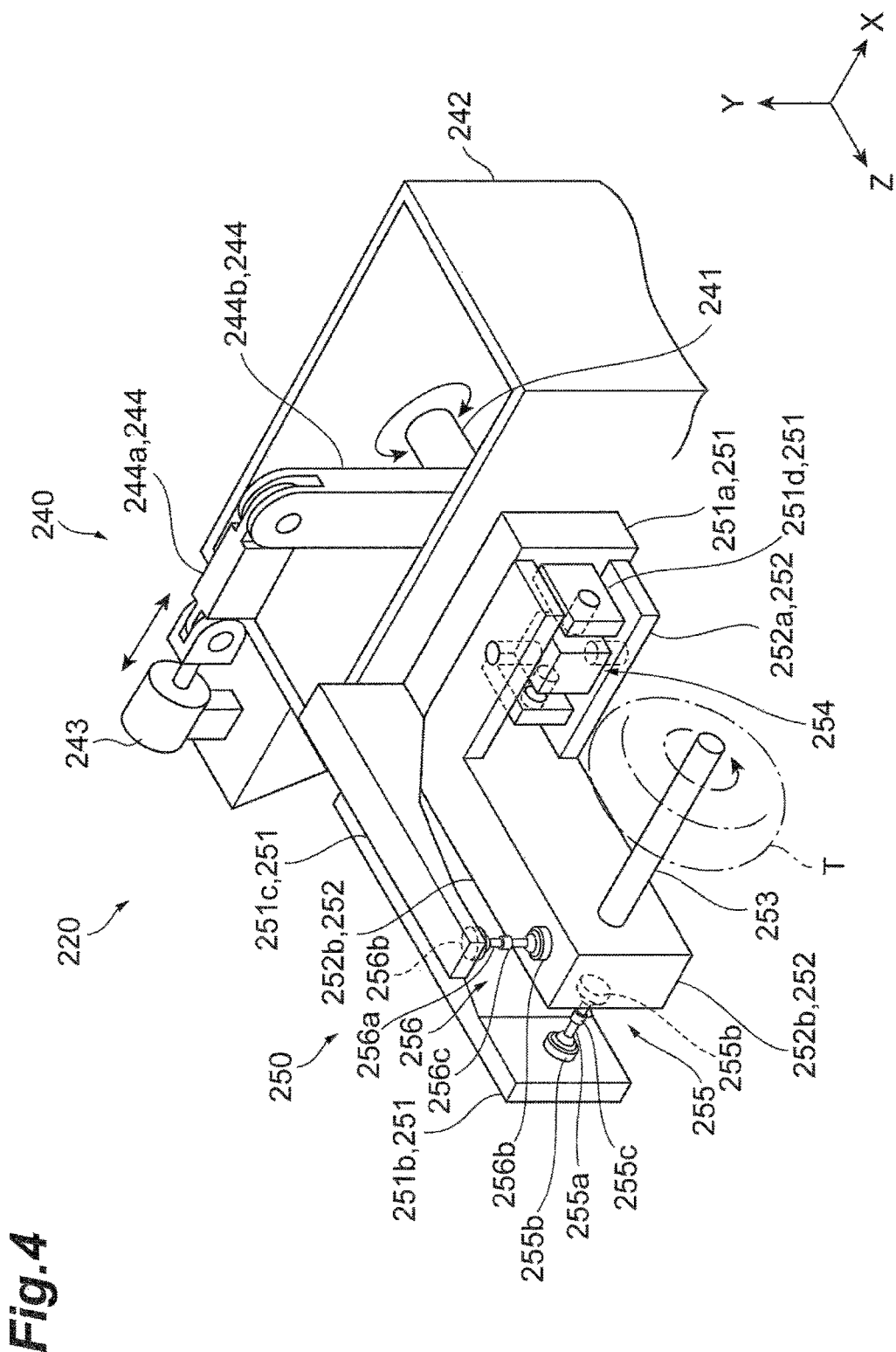
FIG. 4 is a perspective view mainly illustrating a tire support mechanism.

The measurement mechanism 250 is configured to be capable of supporting the tire T, and capable of measuring the load acting on the supported tire T. As illustrated in FIG. 1, FIG. 2, and FIG. 4, the measurement mechanism 250 includes a main frame 251, a subframe 252, an axle 253, a support shaft 254, and two measurement units 255 and 256.

The main frame 251 includes a base portion 251a and extending portions 251b and 251c. The base portion 251a is a plate-like member extending along the X direction. The distal end portion of the main shaft 241 is fixed to one end portion of the base portion 251a. Specifically, the main frame 251 is connected with the actuator 210 through the main shaft 241. A side surface of the base portion 251a opposed to the rotary mechanism 100 side is integrally provided with a pair of auxiliary walls 251d.

The extending portion 251b (first portion) is a plate-like member extending in the Z direction from the other end portion of the base portion 251a toward the rotary mechanism 100 side. One end portion of the extending portion 251b is integrally provided with the other end portion of the base portion 251a. For this reason, the base portion 251a and the extending portion 251b has an L shape as viewed from the Y direction.

The extending portion 251c (second portion) is a plate-like member extending in the Z direction from the side surface of the base portion 251a toward the rotary mechanism 100 side. One end portion of the extending portion 251c is integrally provided with an upper side surface of a middle portion of the base portion 251a. For this reason, the base portion 251a and the extending portion 251c has an L shape as viewed from the X direction.

The subframe 252 includes a pair of base portions 252a and an extending portion 252b. The base portions 252a forming a pair are plate-like members extending in substantially parallel with each other along the X direction. The base portions 252a are opposed to each other in the Y direction. The base portions 252a are arranged to hold the auxiliary walls 251d therebetween on one end side.

The extending portion 252b is a plate-like member extending in the Z direction from the other end portions of the base portions 252a toward the rotary member 100 side. One end portion of the extending portion 252b is integrally provided with the other end portions of the base portions 252a. For this reason, the base portions 252a and the extending portion 252b have an L shape, as viewed from the Y direction.

The extending portion 252b is opposed to the extending portion 251b of the main frame 251 in the X direction. The extending portion 252b is opposed to the extending portion 251c of the main frame 251 in the Y direction.

The axle 253 is a cylindrical member extending in the X direction. One end portion of the axle 253 is fixed to the other end portion (distal end portion) of the extending portion 252b of the subframe 252. For this reason, the axle 253 is supported in a cantilever manner with the subframe 252 (extending portion 252b). The axle 253 supports the tire T rotatably around the axle 253 when the tire T is tested with the tire tester 1. As illustrated in FIG. 1 and FIG. 2, in the state in which the tire T is attached to the axle 253, the ground contact surface of the tire T is opposed to the circumferential surface of the rotary member 102.

Figure 5:
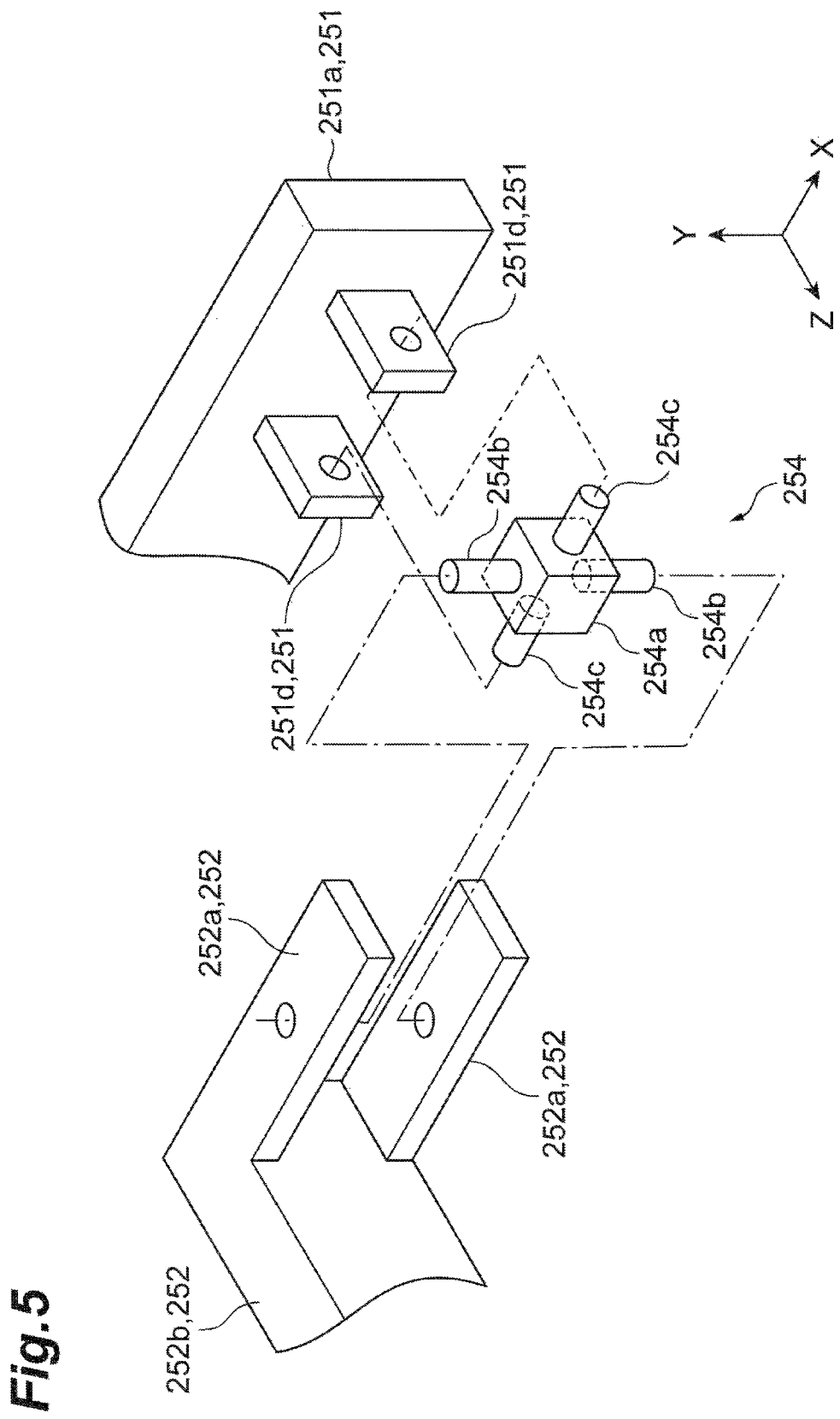
FIG. 5 is an exploded perspective view mainly illustrating a support shaft and therearound.

As illustrated in FIG. 1, FIG. 2, FIG. 4, and FIG. 5, the support shaft 254 is a universal joint (such as a cross joint), and disposed in a space surrounded with the auxiliary walls 251d and the base portions 252a. The support shaft 254 includes a main body portion 254a having a rectangular parallelepiped shape, a pair of shafts 254b (first shaft), and a pair of shafts 254c (second shaft), as illustrated in FIG. 5.

The shafts 254b project from a pair of side surfaces opposed to each other in the Y direction in the main body portion 254a. Each of the shafts 254b extends in a straight line manner along the Y direction. Each of the shafts 254b is attached to the base portions 252a via a bearing (not illustrated) such as a rolling bearing, respectively. For this reason, the subframe 252 is rotatably supported with the main frame 251 around the axis of the shafts 254b.

The shafts 254c project from a pair of side surfaces opposed to each other in the X direction in the main body portion 254a. Each of the shafts 254c extends in a straight line manner along the X direction. Each of the shafts 254c is attached to the auxiliary walls 251d via a bearing (not illustrated) such as a rolling bearing, respectively. For this reason, the subframe 252 is rotatably supported with the main frame 251 around the axis of the shafts 254c.

As illustrated in FIG. 2 and FIG. 4, the measurement unit 255 (first measurement unit) is provided between the extending portion 251b of the main frame 251 and the extending portion 252b of the subframe 252. The measurement unit 255 includes a coupling member 255a, a pair of bearings 255b, and a load sensor 255c.

The coupling member 255a is, for example, a rod-shaped member coupling the extending portion 251b with the extending portion 252b via the load sensor 255c, and extends along the X direction. Specifically, one end portion of the coupling member 255a is connected with the extending portion 251b through one of the bearings 255b. The other end portion of the coupling member 255a is connected with the extending portion 252b through the other of the bearings 255b.

The bearings 255b have degree of freedom in at least two directions of the X direction and the Y direction. Each of the bearings 255b may be, for example, a universal joint, or a spherical bearing as illustrated in FIG. 2 and FIG. 4.

The load sensor 255c is configured to be capable of measuring a load generated on the coupling member 255a. Specifically, the load sensor 255c measures a load (lateral force Fx) generated on the tire T in the X direction when the tire T contacts the rotary member 102. The load sensor 255c may be, for example, a load cell.

As illustrated in FIG. 1 and FIG. 4, the measurement unit 256 (second measurement unit) is provided between the extending portion 251c of the main frame 251 and the extending portion 252b of the subframe 252. The measurement unit 256 includes a coupling member 256a, a pair of bearings 256b, and a load sensor 256c.

The coupling member 256a is, for example, a rod-shaped member coupling the extending portion 251c with the extending portion 252b via the load sensor 256c, and extends along the Y direction. Specifically, one end portion of the coupling member 256a is connected with the extending portion 251c through one of the bearings 256b. The other end portion of the coupling member 256a is connected with the extending portion 252b through the other of the bearings 256b.

The bearings 256b have degree of freedom in at least two directions of the X direction and the Y direction. Each of the bearings 256b may be, for example, a universal joint, or a spherical bearing as illustrated in FIG. 1 and FIG. 4.

The load sensor 256c is configured to be capable of measuring a load generated on the coupling member 256a.

Specifically, the load sensor 256c measures a load (rolling resistance Fy) generated on the tire T in the Y direction when the tire T contacts the rotary member 102. The load sensor 256c may be, for example, a load cell.

Measurement Principle

Figure 6:
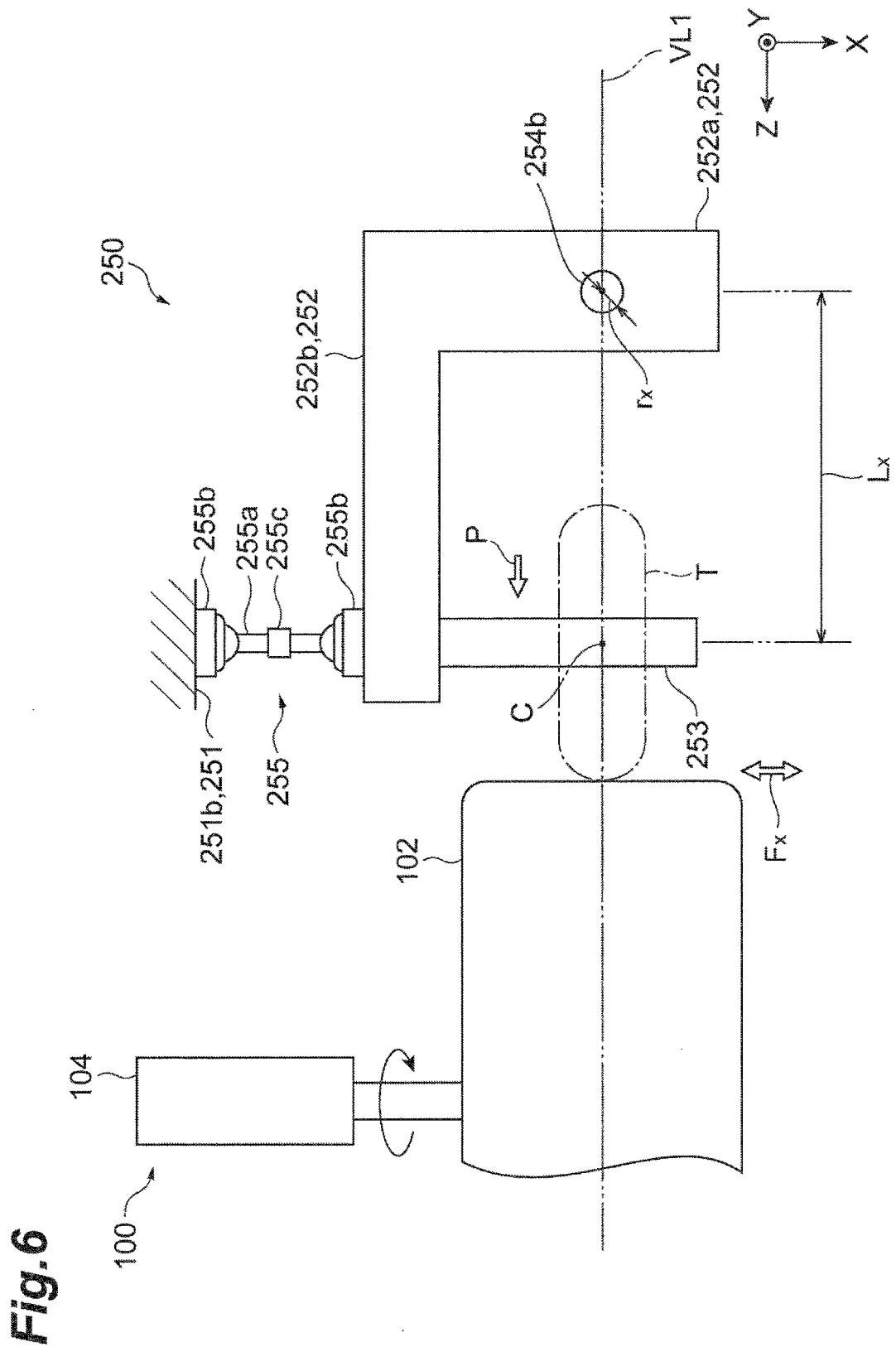
FIG. 6 is a schematic diagram for explaining a principle of measuring a load in an X direction.
Figure 7:
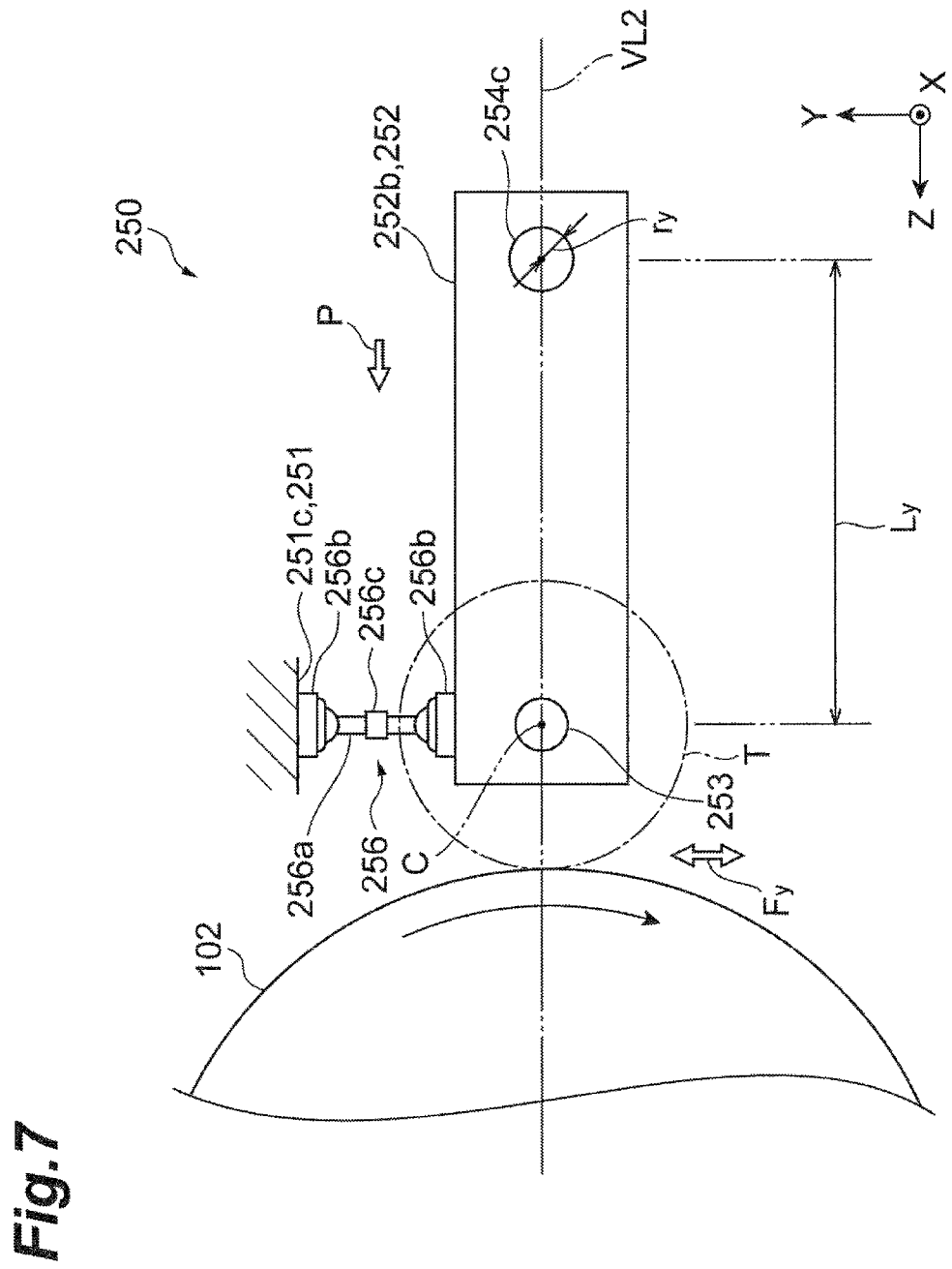
FIG. 7 is a schematic diagram for explaining a principle of measuring a load in a Y direction.

The following is an explanation of a principle of measurement of the lateral force Fx and the rolling resistance Fy, with reference to FIG. 6 and FIG. 7. First, in the state in which the tire support mechanism 220 is separated from the rotary mechanism 100, the tire T serving as the test target is attached to the axle 253. In this state, as illustrated in FIG. 6, the attachment position of the tire T to the axle 253 is adjusted such that the shafts 254b of the support shaft 254 are positioned on an imaginary straight line VL1 extending through a central point C of the tire T and extending in the Z direction, as viewed from the Y direction. In addition, as illustrated in FIG. 7, the attachment position of the tire T to the axle 253 is adjusted such that the shafts 254c of the support shaft 254 are positioned on an imaginary straight line VL2 extending through the central point of the tire T and extending in the Z direction, as viewed from the X direction.

Thereafter, a controller (control unit) that is not illustrated controls the actuator 210 to push out the tire support mechanism 220 toward the rotary mechanism 100 such that the ground contact surface of the tire T is brought in contact with the circumferential surface of the rotary member 102. At this time, the pressing force (thrust) for the tire T with the actuator 210 may be, for example, several tons to several hundred tons.

Thereafter, the controller controls the electric motor 104 to rotate the rotary member 102. The tangential velocity of the rotary member 102 may be, for example, dozens of kilometers to several hundred kilometers per hour. In this manner, the tire T receives the drag from the rotary member 102, and is rotated around the axle 253. Specifically, the circumferential surface of the rotary member 102 functions as the traveling simulation road surface of the tire T.

In this state, when the controller controls the actuator 243 to rotate the main shaft 241 via the link mechanism 244, the tire T is inclined at a predetermined angle with respect to the circumferential surface (traveling simulation road surface) of the rotary member 102. The angle is made between the tangential direction of the tire T on the circumferential surface of the rotary member 102 and a direction to which the tire T actually advances, and also referred to as "slip angle". In the state in which the tire T is provided with a slip angle, the lateral force Fx is generated on the tire T, as illustrated in FIG. 6.

When the lateral force Fx is generated on the tire T, the reaction force thereof acts on the subframe 252 through the axle 253, and the subframe 252 is rotated around the shafts 254b. In this manner, the coupling member 255a coupling the main frame 251 (extending portion 251b) with the subframe 252 (extending portion 252b) receives compressive force or tensile force. The load sensor 255c measures the compressive force or the tensile force, and outputs the measurement value to, for example, the controller.

A mechanical loss MLx generated in the shafts 254b is calculated with Expression 1:

$$MLx = P \times \mu x \times rx / Lx \quad (1)$$

where parameters P, μx, rx, and Lx are as follows:
P: pressing force for tire T with actuator 210
μx: rolling friction coefficient in shafts 254b
rx: radius of shafts 254b
Lx: straight-line distance between the central point of the shafts 254b and the central point C of the tire T.

The mechanical loss MLx is desired to be as small as possible, because the mechanical loss MLx appears as error in the load sensor 255c. Because an error due to the temperature or the like also occurs in the load sensor 255c in addition to the error due to the mechanical loss MLx, the whole error in the load sensor 255c may be 1% or less, and the error due to the mechanical loss MLx in the load sensor 255c may be 0.1% or less. Specifically, the value of μx×rx/Lx may be 0.1% or less.

By contrast, as illustrated in FIG. 7, rolling resistance Fy is generated on the tire T traveling on the traveling simulation road surface. When rolling resistance Fy is generated on the tire T, the reaction force thereof acts on the subframe 252 through the axle 253, and the subframe 252 is rotated around the shafts 254c. In this manner, the coupling member 256a coupling the main frame 251 (extending portion 251c) with the subframe 252 (extending portion 252b) receives compressive force or tensile force. The load sensor 256c measures the compressive force or the tensile force, and outputs the measurement value to, for example, the controller.

A mechanical loss MLy generated in the shafts 254c is calculated with Expression 2:

$$MLy = P \times \mu y \times ry / Ly \quad (2)$$

where parameters P, μy, ry, and Ly are as follows:
P: pressing force for tire T with actuator 210
μy: rolling friction coefficient in shafts 254c
ry: radius of shafts 254c
Ly: straight-line distance between the central point of the shafts 254c and the central point C of the tire T.

The mechanical loss MLy is desired to be as small as possible, because the mechanical loss MLy appears as error in the load sensor 256c. In the same manner as the load sensor 255c, the whole error in the load sensor 256c may also be 1% or less, and the error due to the mechanical loss MLy in the load sensor 256c may be 0.1% or less. Specifically, the value of μy×ry/Ly may be 0.1% or less.

Functions

In the tire tester of Japanese Unexamined Patent Publication No. H5-005677, the three forces of the lateral force Fx, the rolling resistance Fy, and the pressing load Fz simultaneously act on the piston rod. For this reason, the pressing load Fz measured with the first load cell has a value including an influence of the lateral force Fx and the rolling resistance Fy. The lateral force Fx measured with the second load cell has a value including an influence of the rolling resistance Fy and the pressing load Fz. The rolling resistance Fy measured with the second load cell has a value including an influence of the lateral force Fx and the pressing load Fz. Accordingly, difficulty exists in measuring accurate loads.

However, in the present embodiment as described above, the subframe 252 (extending portion 252b) supports the axle 253, and is attached to the main frame 251 such that the subframe 252 is rotatable around the shafts 254b extending in the Y direction. For this reason, even when the actuator 210 drives the tire support mechanism 220 to make the ground contact surface of the tire T contact the circumferential surface of the rotary member 102 and the tire T receives a load from the rotary member 102, the subframe 252 is not moved in the Z direction, but rotated around the shafts 254b. Accordingly, the measurement unit 255 (load sensor 255c) provided between the main frame 251 (extending portion 251b) and the subframe 252 (extending portion 252b) hardly includes the component of the load acting on the tire T in the Z direction. In the same manner, in the present embodiment, the subframe 252 (extending portion 252b) supports the axle 253, and is attached to the main frame 251 such that the subframe 252 is rotatable around the shafts 254c extending in the X direction. For this reason, even when the actuator 210 drives the tire support mechanism 220 to make the ground contact surface of the tire T contacts the circumferential surface of the rotary member 102 and the tire T receives a load from the rotary member 102, the subframe 252 is not moved in the Z direction, but rotated around the shafts 254c. Accordingly, the measurement unit 256 (load sensor 256c) provided between the main frame 251 (extending portion 251c) and the subframe 252 (extending portion 252b) hardly includes the component of the load acting on the tire T in the Z direction. As a result, this structure enables accurate measurement of the components (lateral force Fx and rolling resistance Fy) of the load acting on the tire T in the predetermined direction (direction in which the main frame 251 is opposed to the subframe 252).

A plurality of types exist for the diameter of the tire T, and a plurality of types exist also for the hub of the tire T. For this reason, when the load sensor is attached to the hub of the tire T to measure the load, an optimum attachment position of the load sensor or the like is required to be considered for each of combinations of the diameter and the hub of the tire T. In addition, because the hub may be deformed when the load acts on the tire T, the accuracy of the measurement value of the load sensor may decrease when the load sensor is attached to the hub. However, the present embodiment removes the necessity for attaching the load sensor to the hub of the tire T to measure the load acting on the tire T. For this reason, the tire tester 1 according to the present embodiment enables simple and accurate measurement of the load acting on the tire T of various types.

In the present embodiment, the shafts 254b of the support shaft 254 are positioned on the imaginary straight line VL1, as illustrated in FIG. 6. In addition, the shafts 254c of the support shaft 254 are positioned on the imaginary straight line VL2, as illustrated in FIG. 7. This structure removes the necessity for correcting the measurement values of the load sensors 255c and 256c. Accordingly, this structure enables easy measurement of the load in the load sensors 255c and 256c.

In the present embodiment, the support shaft 254 is a universal joint including the shafts 254b and 254c. With the structure, one support shaft 254 achieves both rotation of the subframe 252 with respect to the extending portion 251b of the main frame 251, and rotation of the subframe 252 with respect to the extending portion 251c of the main frame 251. This structure can simplify the tire tester 1.

In the present embodiment, the coupling member 255a couples the main frame 251 with the subframe 252 via the bearings 255b forming a pair, and the coupling member 256a couples the main frame 251 with the subframe 252 via the bearings 256b forming a pair. This structure suppresses a bend of the coupling members 255a and 256a when the subframe 252 is rotated around the support shaft 254. Accordingly, this structure enables measurement of the components of the load acting on the tire T in the direction in which the main frame 251 is opposed to the subframe 252 with higher accuracy by using the load sensors 255c and 256c.

Other Examples of Embodiment

The foregoing embodiments in the present disclosure have been described in detail: however, various modifications may be made. For example, the tire tester 1 may further include a measurement unit (load sensor) configured to measure the pressing load Fz.

The actuator 210 may be configured to advance and retreat the rotary mechanism 100 with respect to the tire support mechanism 220 such that the rotary member 102 is brought close to and apart from the tire T. As another example, the actuator 210 may be configured to advance and retreat at least one of the rotary mechanism 100 and the tire support mechanism 220 with respect to the other.

The subframe 252 may have a U shape, and both end portions of the axle 253 may be supported with the subframe 252 in a double-supported manner with the subframe 252.

The tester main body 200 may be configured to be rotatable with respect to a predetermined central axis. The predetermined central axis may extend, for example, in a vertical direction in tangential lines for the circumferential surface of the rotary member 102, and may be disposed on the tester main body 200 side. In this case, the tire T is inclined at a predetermined angle with respect to the circumferential surface (traveling simulation road surface) of the rotary member 102. The angle is made between the central line in the perpendicular direction of the tire T and the circumferential surface of the rotary member 102, and also referred to as "camber angle".

Figure 8:
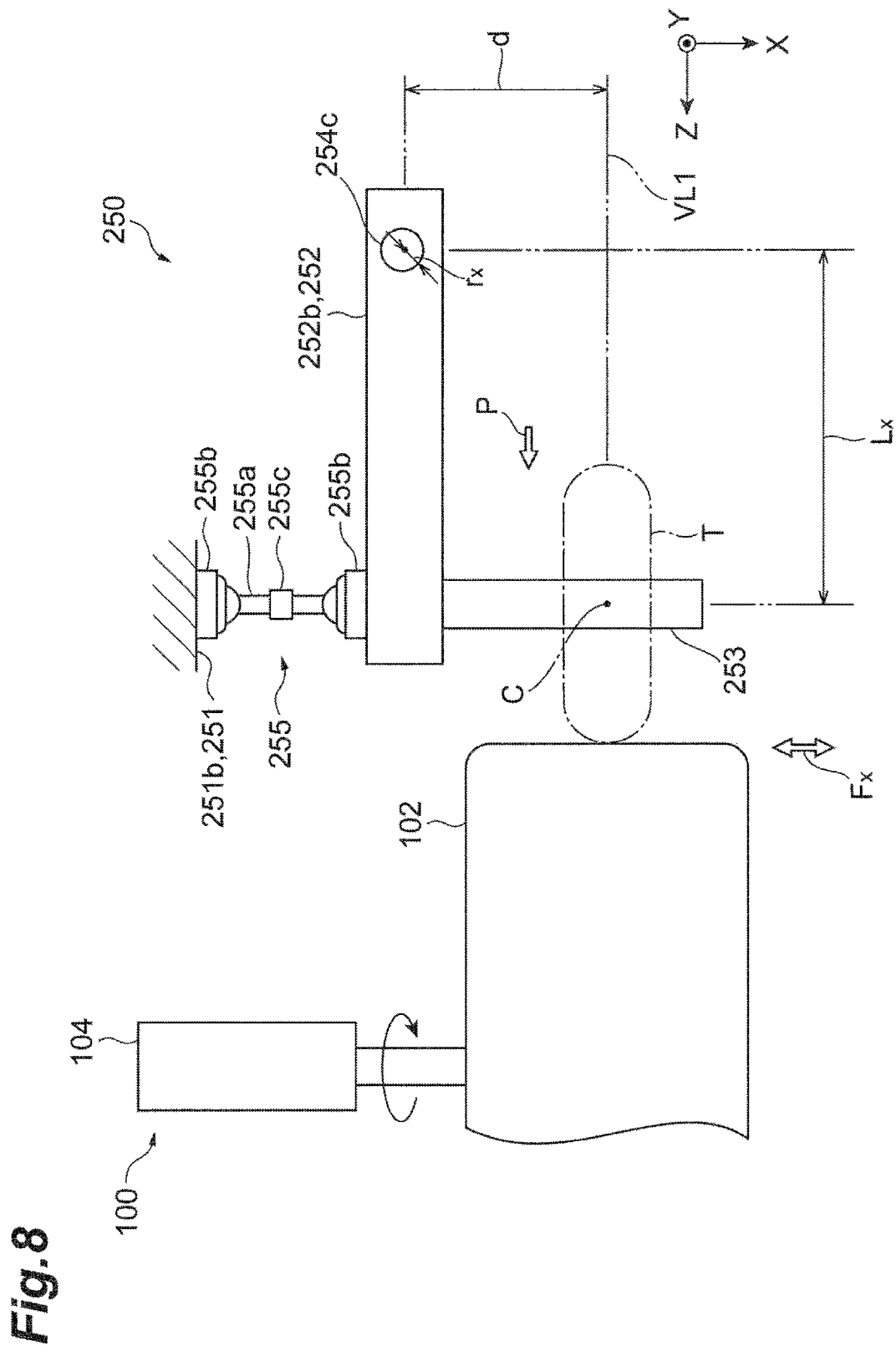
FIG. 8 is a schematic diagram for explaining a principle of measuring a load in the X direction in the tire support mechanism according to another example (second example)

As in the tire tester 1 according to a second example illustrated in FIG. 8, the shafts 254b of the support shaft 254 are not positioned on the imaginary straight line VL1, as viewed from the Y direction. In this case, the measurement value of the load sensor 255c requires correction by the value of the distance d with which the shafts 254b are shifted from the imaginary straight line VL1. Specifically, P×d/Lx is added to or subtracted from the measurement value of the load sensor 255c, in accordance with the position of shift of the shafts 254d from the imaginary straight line VL1. The same is applicable to the case where the shafts 254c of the support shaft 254 are shifted from the imaginary straight line VL2.

Figure 9:
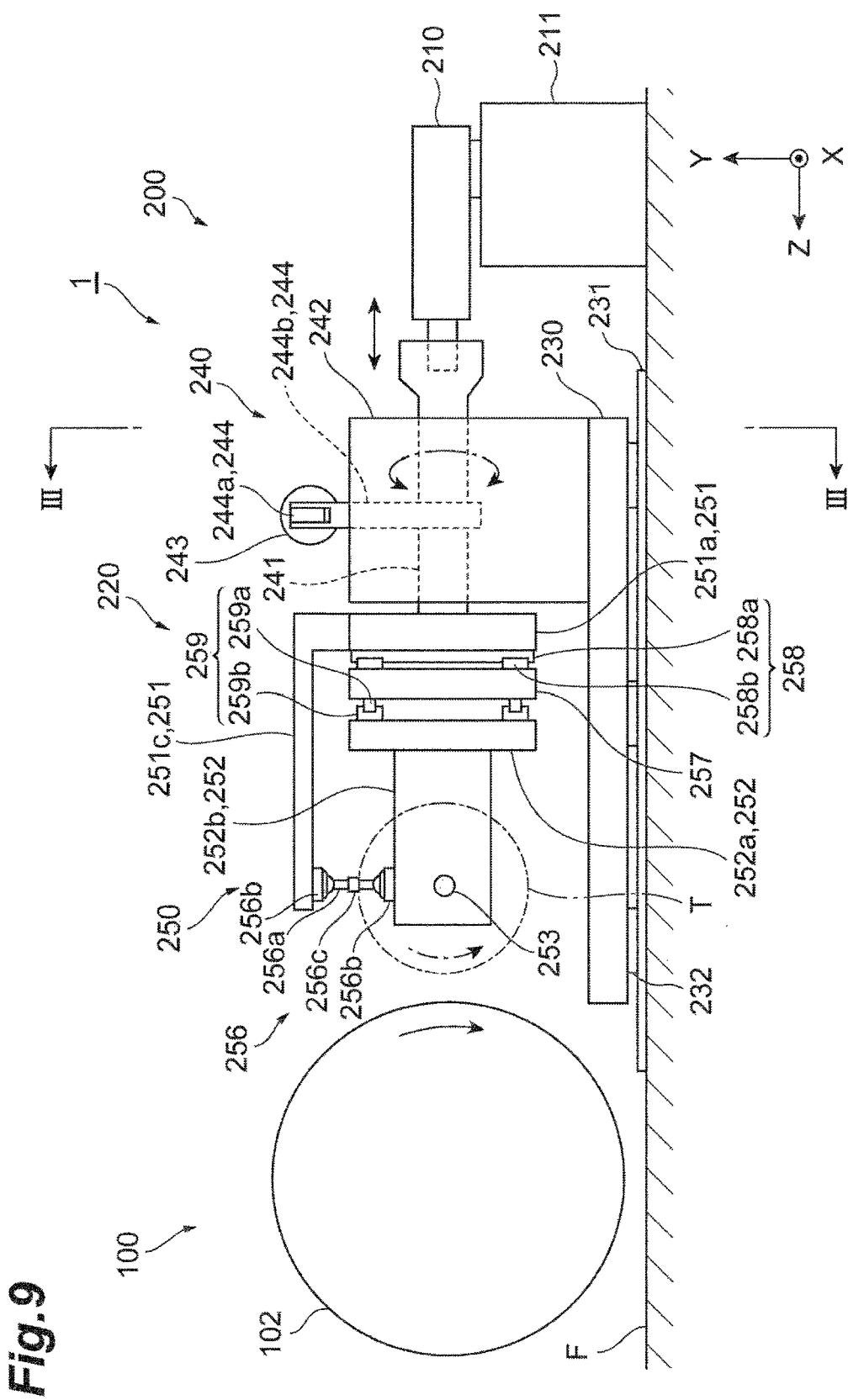
FIG. 9 is a side view illustrating another example (third example) of the tire tester.
Figure 10:
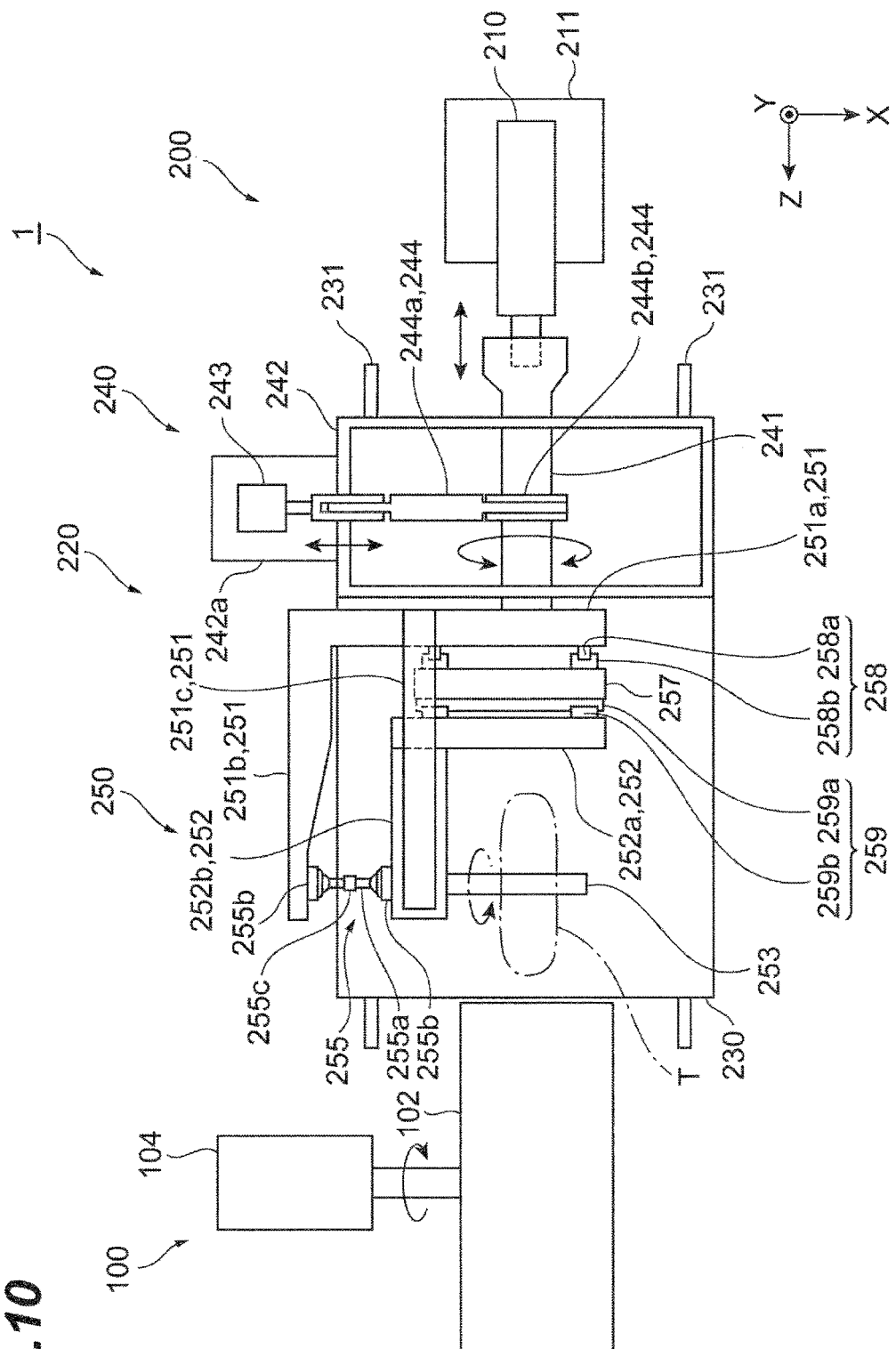
FIG. 10 is a top view illustrating the example (third example) of the tire tester.

As in the tire tester 1 according to a third example illustrated in FIG. 9 and FIG. 10, the measurement mechanism 250 may include an auxiliary frame 257, a pair of linear motion bearings 258, and a pair of linear motion bearings 259, instead of the auxiliary walls 251d and the support shaft 254. Specifically, the auxiliary frame 257 is disposed between the base portion 251a of the main frame 251 and the base portion 252a of the subframe 252. In the measurement mechanism 250 illustrated in FIG. 9 and FIG. 10, the base portion 252a of the subframe 252 is a plate-like member extending along the X direction, like the base portion 251a of the main frame 251.

The linear motion bearings 258 and 259 are configured to guide members in predetermined one direction. The linear motion bearings 258 and 259 may be, for example, LM guides (registered trademark, manufactured by THK Co., Ltd.).

A pair of linear motion bearings 258 (second linear motion bearing) are disposed between the base portion 251a of the main frame 251 and the auxiliary frame 257. The linear motion bearings 258 are arranged side by side in the X direction. Each of the linear motion bearings 258 includes a guide rail 258a having a straight line shape, and a slider 258b.

The guide rail 258a is provided on a surface of the base portion 251a of the main frame 251, the surface opposing to the auxiliary frame 257. The guide rail 258a extends in the Y direction (direction in which the extending portion 251c of the main frame 251 is opposed to the extending portion 252b of the subframe 252). The slider 258b is provided on a surface of the auxiliary frame 257, the surface opposing to the base portion 251a of the main frame 251. A plurality of rolling elements (such as steel balls, cylindrical rollers, and the like) (not illustrated) is provided inside the slider 258b. The slider 258b is attached to the guide rail 258a such that the rolling elements disposed inside thereof contact the guide rail 258a. Accordingly, the auxiliary frame 257 is attached to the main frame 251 through the linear motion bearings 258.

The slider 258b is capable of linearly moving on the guide rail 258a, by rotation of the rolling elements themselves and circulation of the rolling elements inside the slider 258b. Accordingly, the auxiliary frame 257 is guided along the extending direction (Y direction) of the guide rail 258a via the slider 258b on the main frame 251.

A pair of linear motion bearings 259 (first linear motion bearing) are disposed between the auxiliary frame 257 and the base portion 252a of the subframe 252. The linear motion bearings 259 are arranged side by side in the Y direction. Each of the linear motion bearings 259 includes a guide rail 259a having a straight line shape, and a slider 259b.

The guide rail 259a is provided on a surface of the auxiliary frame 257, the surface opposing to the base portion 252a of the subframe 252. The guide rail 259a extends in the X direction (direction in which the extending portion 251b of the main frame 251 is opposed to the extending portion 252b of the subframe 252). The slider 259b is provided on a surface of the base portion 252a of the subframe 252, the surface opposing to the auxiliary frame 257. A plurality of rolling elements (such as steel balls, cylindrical rollers, and the like) (not illustrated) is provided inside the slider 259b. The slider 259b is attached to the guide rail 259a such that the rolling elements disposed inside thereof contact the guide rail 259a. Accordingly, the subframe 252 is attached to the auxiliary frame 257 through the linear motion bearings 259.

The slider 259b is capable of linearly moving on the guide rail 259a, by rotation of the rolling elements themselves and circulation of the rolling elements inside the slider 259b. Accordingly, the subframe 252 is guided along the extending direction (X direction) of the guide rail 259a via the slider 259b on the auxiliary frame 257.

In the measurement mechanism 250 according to the third example, when the ground contact surface of the tire T supported with the axle 253 is brought in contact with the circumferential surface of the rotary member 102 during rotation in the state in which a slip angle is set for the tire T, lateral force Fx in the X direction is generated on the tire T. When the lateral force Fx is generated on the tire T, the reaction force thereof acts on the subframe 252 through the axle 253, and the subframe 252 is linearly moved in the X direction along the guide rails 259a. By contrast, because the linear motion bearings 258 disposed between the auxiliary frame 257 and the main frame 251 is not moved in any directions other than the Y direction, the auxiliary frame 257 is not moved with respect to the main frame 251, even when the reaction force of the lateral force Fx acts on the auxiliary frame 257 through the subframe 252. In this manner, the coupling member 255a coupling the main frame 251 (extending portion 251b) with the subframe 252 (extending portion 252b) receives compressive force or tensile force. The load sensor 255c measures the compressive force or the tensile force, and outputs the measurement value to, for example, the controller.

By contrast, rolling resistance Fy in the Y direction is generated on the tire T traveling on the traveling simulation road surface. When rolling resistance Fy is generated on the tire T, the reaction force thereof acts on the subframe 252 through the axle 253. Because the linear motion bearings 259 disposed between the subframe 252 and the auxiliary frame 257 is not moved in any directions other than the X direction, the subframe 252 is not moved with respect to the auxiliary frame 257, even when the reaction force of the rolling resistance Fy acts on the subframe 252. By contrast, when the reaction force of the rolling resistance Fy acts on the auxiliary frame 257 through the subframe 252 and the linear motion bearings 259, the auxiliary frame 257 is linearly moved in the Y direction along the guide rails 258a. In this manner, the coupling member 256a coupling the main frame 251 (extending portion 251c) with the subframe 252 (extending portion 252b) receives compressive force or tensile force. The load sensor 256c measures the compressive force or the tensile force, and outputs the measurement value to, for example, the controller.

As described above, in the tire tester 1 according to the third example, the auxiliary frame 257 is linearly moved in the Y direction with respect to the main frame 251 with the linear motion bearings 258. Specifically, the linear motion bearings 258 restrict rotation movement of the auxiliary frame 257 with respect to the main frame 251. By contrast, the subframe 252 is linearly moved in the X direction with respect to the auxiliary frame 257 with the linear motion bearings 259. Specifically, the linear motion bearings 259 restrict rotation movement of the subframe 252 with respect to the auxiliary frame 257. For this reason, the load sensors 255c and 256c hardly include rotation components (moment) of the subframe 252 and the auxiliary frame 257. Accordingly, the load sensor 255c is enabled to measure, with very high accuracy, the load generated on the tire T in the X direction, when the ground contact surface of the tire T contacts the rotary member 102. In the same manner, the load sensor 256c is enabled to measure, with very high accuracy, the load generated on the tire T in the Y direction, when the ground contact surface of the tire T contacts the rotary member 102. The structure described above enables measurement, with very high accuracy, of the component of the load generated on the tire T in the X direction, and the component of the load generated on the tire T in the Y direction, in one tire tester 1.

In the measurement mechanism 250 according to the third example, the numbers of linear motion bearings 258 and 259 are not specifically limited, but may be at least one.

In the measurement mechanism 250 according to the third example, linear motion bearings 258 including guide rails 258a extending in the Y direction may be disposed between the auxiliary frame 257 and the subframe 252, and linear motion bearings 259 including guide rails 259a extending in the X direction may be disposed between the main frame 251 and the auxiliary frame 257.

The extending direction of the guide rails 258a may be a direction crossing the Z direction (the direction in which the tire support mechanism 220 is driven with the actuator 210). The extending direction of the guide rails 259a may be a direction crossing both the Z direction and the extending direction of the guide rails 258a.

In the tire tester 1 described above, one of the lateral force Fx and the rolling resistance Fy may be measured. For example, when the lateral force Fx is measured and the rolling resistance Fy is not measured in the tire tester 1 according to the first and the second examples, the support shaft 254 may include no shafts 254c. In the same manner, when the lateral force Fx is not measured and the rolling resistance Fy is measured in the tire tester 1 according to the first and the second examples, the support shaft 254 may include no shafts 254b. When the lateral force Fx is measured and the rolling resistance Fy is not measured in the tire tester 1 according to the third example, the measurement mechanism 250 may include no auxiliary frame 257 and linear motion bearings 258, and the subframe 252 may be attached to the main frame 251 via the linear motion bearings 259. In the same manner, when the lateral force Fx is not measured and the rolling resistance Fy is measured in the tire tester 1 according to the third example, the measurement mechanism 250 may include no auxiliary frame 257 and linear motion bearings 259, and the subframe 252 may be attached to the main frame 251 via the linear motion bearings 258.

Indeed, the devices and methods described herein may be embodied in a variety of other forms; furthermore, various omissions, substitutions and changes in the form of the devices and methods described herein may be made in arrangement and detail. The accompanying claims and their equivalents are intended to cover such forms or modification as would fall within the scope and spirit of the subject matter claimed herein.

What is claimed is:

1. A tire tester comprising:
   a rotary member including a circumferential surface functioning as a traveling simulation road surface for a tire;
   a tire support mechanism configured to support the tire; and
   an actuator configured to advance and retreat at least one of the rotary member and the tire support mechanism with respect to the other such that the tire supported with the tire support mechanism is brought close to and apart from the circumferential surface of the rotary member, wherein
   the tire support mechanism includes:
      an axle extending in a second direction orthogonal to a first direction in which the rotary member or the tire support mechanism advances and retreats with the actuator, and supporting the tire to be rotatable such that a ground contact surface of the tire is opposed to the circumferential surface of the rotary member;
      a main frame connected with the actuator;
      a subframe supporting the axle, and movably attached to the main frame such that a distance of the subframe from the main frame decreases and increases in a direction crossing the first direction; and
      at least one measurement unit provided between the main frame and the subframe.

2. The tire tester according to claim 1, wherein
   the main frame and the subframe are opposed to each other in the second direction, and
   the subframe is attached to the main frame via a linear motion bearing such that the distance from the main frame decreases and increases in the second direction.

3. The tire tester according to claim 1, wherein
   the main frame and the subframe are opposed to each other in a third direction orthogonal to both the first direction and the second direction, and
   the subframe is attached to the main frame via a linear motion bearing such that the distance of the subframe from the main frame decreases and increases in the third direction.

4. The tire tester according to claim 1 further comprising an auxiliary frame disposed between the main frame and the subframe, wherein
   the main frame includes:
      a first portion opposed to the subframe in the second direction; and
      a second portion opposed to the subframe in a third direction orthogonal to both the first direction and the second direction,
   the at least one measurement unit includes:
      a first measurement unit provided between the first portion and the subframe; and
      a second measurement unit provided between the second portion and the subframe,
   the subframe is attached to the auxiliary frame via a first linear motion bearing such that a distance of the subframe from the main frame decreases and increases in one of the second direction and the third direction, and
   the auxiliary frame is attached to the main frame via a second linear motion bearing such that a distance of the auxiliary frame from the main frame decreases and increases in the other of the second direction and the third direction.

5. The tire tester according to claim 1, wherein the subframe is attached to the main frame such that the subframe is rotatable around a support shaft extending in a direction orthogonal to the first direction.

6. The tire tester according to claim 5, wherein the support shaft is disposed on an imaginary straight line extending through a central point of the tire and extending in the first direction, as viewed from an axis direction of the support shaft, in a state in which the tire is attached to the axle.

7. The tire tester according to claim 5, wherein
   the main frame and the subframe are opposed to each other in the second direction, and
   the support shaft extends along a third direction orthogonal to both the first direction and the second direction.

8. The tire tester according to claim 6, wherein
   the main frame and the subframe are opposed to each other in the second direction, and
   the support shaft extends along a third direction orthogonal to both the first direction and the second direction.

9. The tire tester according to claim 5, wherein
   the main frame and the subframe are opposed to each other in a third direction orthogonal to both the first direction and the second direction, and
   the support shaft extends along the second direction.

10. The tire tester according to claim 6, wherein
    the main frame and the subframe are opposed to each other in a third direction orthogonal to both the first direction and the second direction, and
    the support shaft extends along the second direction.

11. The tire tester according to claim 5, wherein
    the main frame includes:
       a first portion opposed to the subframe in the second direction; and
       a second portion opposed to the subframe in a third direction orthogonal to both the first direction and the second direction,
    the support shaft includes:
       a first shaft extending along the third direction and supporting the subframe rotatably with respect to the first portion; and
       a second shaft extending along the second direction and supporting the subframe rotatably with respect to the second portion, and
    the at least one measurement unit includes:
       a first measurement unit provided between the first portion and the subframe; and
       a second measurement unit provided between the second portion and the subframe.

12. The tire tester according to claim 6, wherein
the main frame includes:
- a first portion opposed to the subframe in the second direction; and
- a second portion opposed to the subframe in a third direction orthogonal to both the first direction and the second direction, the support shaft includes:
- a first shaft extending along the third direction and supporting the subframe rotatably with respect to the first portion; and
- a second shaft extending along the second direction and supporting the subframe rotatably with respect to the second portion, and the at least one measurement unit includes:
- a first measurement unit provided between the first portion and the subframe; and
- a second measurement unit provided between the second portion and the subframe.

13. The tire tester according to claim 11, wherein the support shaft is a universal joint including the first shaft and the second shaft.

14. The tire tester according to claim 12, wherein the support shaft is a universal joint including the first shaft and the second shaft.

15. The tire tester according to claim 1, wherein
the measurement unit includes:
- a coupling member coupling the main frame with the subframe; and
- a load sensor configured to measure a load generated on the coupling member, and each of end portions of the coupling member is connected with the main frame and the subframe via a bearing having degree of freedom in at least two directions of the second direction and a third direction orthogonal to both the first direction and the second direction.

16. The tire tester according to claim 15, wherein the bearing is a spherical bearing.

* * * * *